ര്‍2,911,315

Patented Nov. 3, 1959

2,911,315

ETHYL CELLULOSE COMPOSITIONS

James H. Fookes, Hope, and Richard A. Nutter, Shepherd, Mich., assignors to The Dow Chemical Company, Midland, Mich., a corporation of Delaware No Drawing. Application January 23, 1958
Serial No. 710,612

6 Claims. (Cl. 106—189)

This invention relates to improved thermoplastic compositions based on ethyl cellulose. More particularly it relates to such compositions which are capable of being heat sealed with conventional bar type sealing apparatus and of adhering tenaciously to glass and similar smooth surfaces when coated thereon.

Cellulose ethers, esters, and other derivatives have found widespread and diversified use in many fields. Among the most widely accepted of those derivatives are the ethyl celluloses. Those ethyl cellulose ethers have unusually desirable properties, such as impact strength, toughness, and clarity, which make them well adapted for moldings and extrusions. Those same properties would also indicate their utility as extruded or cast sheets in the packaging industry. However, the prior known formulations based on ethyl cellulose have been incapable of heat sealing by conventional apparatus. That deficiency has precluded their use in many packaging applications where a vacuum- or air-tight seal is required.

Attempts have been made to plasticize ethyl cellulose to improve its fabrication tendencies, to adjust one or more properties of the composition to satisfy the particular requirements of a specific end use, or for other reason. The success of those attempts is attested to by the wide acceptance of products based on those compositions. All of those prior compositions, however, have singularly failed in imparting to the ethyl cellulose an ability to be heat sealed by conventional bar type sealers. Since much of the rapid packaging equipment now available requires rapid heat sealing for air and moisture impervious closures, it is believed that the discovery of such an ethyl cellulose composition would greatly expand the utilization of such derivatives.

The properties, such as toughness and clarity, of ethyl cellulose would seem to make it ideal as a glass coating. However, the adhesion of all of the prior coatings based on ethyl cellulose has been unsatisfactory and has in many instances precluded their consideration in that field.

Accordingly it is the principal object of this invention to provide improved plasticized ethyl cellulose compositions.

It is a further object to provide such compositions having capacity for heat sealing with conventional bar type sealers.

Another object is the provision of such compositions having improved adhesive properties to glass and like materials.

The above and related objects are achieved with a composition consisting essentially of ethyl cellulose and 4,4′,6,6′-tetratertiarybutyl-2,2′-biphenol as a plasticizer.

The compositions of this invention may be based upon any of the commercially available ethyl celluloses. These are usually those derivatives having a degree of substitution of from about 2.0 to about 2.75 ethoxy groups per anhydroglucose unit. Because those are the ethers which have been found to have optimum properties and characteristics for most end-uses, they are consequently the preferred base materials for use in these compositions. Ethyl cellulose derivatives having greater or smaller degrees of substitution than those indicated above may be employed if desired without reduction in plasticizing efficiency. Such derivatives result in articles having altered physical properties, however, depending upon the properties of the particular ethyl cellulose.

Cellulose ethers such as ethyl cellulose are also characterized and sold commercially by viscosity grade. For purposes of this application the term, viscosity grade, will be construed to have its usual meaning that it is the viscosity of a 5 percent by weight solution of the cellulose ether in a 60:40 toluene-ethanol solvent measured at 25° C. It has been found that the plasticizing effectiveness of the plasticizer of this invention is independent of viscosity grade. However, for practical reasons the low to medium viscosity grades, such as from about 50 to 100 centipoises are most convenient to fabricate into sheets and similar articles, particularly when those articles are prepared by casting a solution of the composition. Those viscosity grades are therefore preferred.

The plasticizer contemplated for use in this invention is 4,4′,6,6′-tetratertiarybutyl-2,2′-biphenol. A typical process for the preparation of that compound will be described. In that process 2,4-ditertiarybutylphenol is oxidized in an aqueous phase at an alkaline pH using oxygen or an oxygen containing gas as the oxidizing reagent. That process results in a product which is less contaminated with nitro compounds, quinones, and like impurities than those products which result from the use of other oxidizing agents.

The plasticizer of this invention exhibits unusual plasticizing efficiency with ethyl cellulose compositions, and may be employed in the compositions in a wide concentration range. When it is desired to prepare flexible self-supporting films the plasticizer may be used in a concentration of from about 1 to about 50 percent by weight of the ethyl cellulose with satisfactory results. When it is desired to prepare flexible films and semi-rigid sheets it has been found that the plasticizer should be used in an amount of at least about 30 percent by weight. Although more or less than the stated amount may be used, it has been found that compositions containing significantly less than about 10 percent plasticizer have inadequate heat sealability for use in most packaging operations. When more than 50 percent by weight of the plasticizer is used, the tendency toward brittleness is increased. When it is desired to employ the compositions as coatings for glass and the like plasticizer may be employed in a concentration as low as about 10 percent with satisfactory results. The preparation of thick molded sections from these compositions may also be achieved within the above stated ranges. However, the unusual additional properties of heat sealability and glass adhesion imparted to the compositions by the 4,4′,6,6′-tetratertiarybutyl-2,2′-biphenol are usually of little or no significance in articles of such thick sections because such articles do not find utility where those properties are used. Thus, it is with thin coatings and free films where the plasticizer is of particular advantage.

The ethyl celluloses of commerce are all soluble in many common organic solvents such as butanol, ethanol, butyl acetate, methyl ethyl ketone and the like. In the preparation of thin sections, such as coatings and films, it is commonplace to use solvent casting techniques. The plasticizer of this invention is also soluble in most of the common solvents, which will dissolve the ethyl celluloses, so that clear, homogeneous casting dopes may be readily prepared. In the preparation of casting dopes the ingredients may be added to the solvent sequentially or simultaneously and the mixing carried out by conventional means. Techniques which provide the most convenient preparation of such casting dopes will be known by the skilled worker or will be available in the literature.

Other additives, such as pigments, dyes, stabilizers, antioxidants, fillers and the like which are commonly incorporated in cellulose ether formulations may be used in these compositions without impairing the plasticizing effectiveness of the biphenol derivative. It should be apparent, however, that any additive should be chemically inert to both the ethyl cellulose and the biphenol plasticizer.

The films prepared from these compositions exhibit all of the desired properties, such as toughness, clarity, flexibility, hardness, and other properties associated with ethyl cellulose based compositions. In addition the film which contains 4,4',6,6'-tetratertiarybutyl-2,2'-biphenol is capable of heat sealing to itself with conventional bar type heat sealing apparatus. That property, which is unique among useful ethyl cellulose compositions known at this time, permits expansion of these compositions into heretofore prohibited areas of the packaging field by allowing for the rapid closure of packages requiring hermetical sealing. Such films are commonly prepared in a thickness of from about 0.002 to 0.05 inch.

These compositions also exhibit an unusual adhesion to glass when employed as a coating thereon. In order to strip such coatings it is frequently necessary to dampen the coating. It is virtually impossible to strip the dry coatings in one piece.

The advantages of these compositions will be more apparent from the following illustrative examples wherein all parts and percentages are by weight.

EXAMPLE 1

Solutions of ethyl cellulose of 70 centipoises viscosity grade were prepared in a 70/30 benzene-methanol solvent using 4,4',6,6'-tetratertiarybutyl-2,2'-biphenol as plasticizer. Composition A used 13 percent of that plasticizer and composition B used 29 percent of that plasticizer. For purposes of comparison a solution of an unplasticized formulation (composition C) was made. Films were cast on glass plates and dried. The resulting dry films of compositions A and B could not be stripped in one piece. When dampened with a wet cloth the films were stripped and again dried. Tests of physical properties of the films were made in conventional manner with the following results.

*Table I*

| Composition | Tensile Strength (p.s.i.) | Percent Elongation | Film Clarity | Stiffness (Gurley tester, mg./mil) | Softening Point (° C.) | Heat Sealing Ability [1] |
| --- | --- | --- | --- | --- | --- | --- |
| A | 5,410 | 3.6 | Clear | 3.9 | 145 | Good. |
| B | 6,675 | 5.1 | do | 19.8 | 150 | Do. |
| C | 8,403 | 33.2 | do | 17.3 | 204 | Poor. |

[1] Using a Vertrod heat sealer, a heated bar type sealer.

As can be seen, compositions A and B resulted in films having comparable physical properties to those films of composition C. In addition the films from composition A could be heat sealed to each other to give an air tight seal while those of composition C failed when attempts were made to heat seal them.

EXAMPLE 2

To twelve parts of ethyl cellulose were added three parts of 4,4',6,6'-tetratertiarybutyl-2,2'-biphenol and the resulting mix blended (composition A). A similar composition (composition B) was prepared using bis(p-(1,1,3,3-tetramethylbutyl)-phenyl)ether as the plasticizer in place of the biphenol derivative. Compression moldings were prepared and tests of the physical properties made in conventional manner with the following results.

*Table II*

| Composition | Tensile Strength (p.s.i.) | Percent Elongation | Rockwell Hardness (R' scale) | Izod Impact (40° C.) | Heat Distortion at 66 p.s.i. |
| --- | --- | --- | --- | --- | --- |
| A | 7,595 | 38 | 118.7 | 0.8 | 91 |
| B | 4,000 | 25 | 95.0 | 0.5 | 77 |

As can be seen, composition A produced articles of superior properties to those prepared from composition B which contained a commercial plasticizer for ethyl cellulose.

What is claimed is:

1. A composition from which heat sealable articles may be prepared said composition consisting essentially of an organo soluble ethyl cellulose and from 1 to 50 percent by weight of 4,4',6,6'-tetratertiarybutyl-2,2'-biphenol.

2. The composition claimed in claim 1 wherein said ethyl cellulose has a degree of substitution of from about 2.0 to about 2.75 ethoxy substituents per anhydroglucose unit.

3. As a new article of manufacture a film of a composition consisting essentially of an organo soluble ethyl cellulose and from 1 to 50 percent by weight of 4,4',6,6'-tetratertiarybutyl-2,2'-biphenol.

4. The article claimed in claim 3 wherein said ethyl cellulose has a degree of substitution of from about 2.0 to about 2.75 ethoxy substituents per anhydroglucose unit.

5. The article claimed in claim 3 wherein said film has a thickness of from about 0.002 to about 0.05 inch.

6. The article claimed in claim 3 wherein said film is free and self-supporting and is characterized by heat sealability with bar type sealers.

References Cited in the file of this patent

UNITED STATES PATENTS

| | | |
| --- | --- | --- |
| 2,605,328 | Pintell | July 29, 1952 |
| 2,785,188 | Coe | Mar. 12, 1957 |

OTHER REFERENCES

Dow: "Ethocel" (reprint from Plastic Materials and Plasticizers, published in 1938 by The Dow Chemical Company), 4 pages.